(12) United States Patent
Carralero et al.

(10) Patent No.: US 10,338,328 B2
(45) Date of Patent: Jul. 2, 2019

(54) RUGGEDIZED PHOTONIC CRYSTAL SENSOR PACKAGING

(71) Applicant: The Boeing Company, Chicago, IL (US)

(72) Inventors: Michael A. Carralero, Chicago, IL (US); Eric Y. Chan, Chicago, IL (US); Dennis G. Koshinz, Chicago, IL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/957,784

(22) Filed: Apr. 19, 2018

(65) Prior Publication Data

US 2018/0246285 A1 Aug. 30, 2018

Related U.S. Application Data

(62) Division of application No. 15/294,584, filed on Oct. 14, 2016, now Pat. No. 10,061,093, which is a
(Continued)

(51) Int. Cl.
*G02B 6/42* (2006.01)
*G02B 6/36* (2006.01)
(Continued)

(52) U.S. Cl.
CPC ........... *G02B 6/4248* (2013.01); *G01D 5/268* (2013.01); *G01D 11/245* (2013.01);
(Continued)

(58) Field of Classification Search
None
See application file for complete search history.

(56) References Cited

U.S. PATENT DOCUMENTS 3,093,792 A 6/1963 Steenfeld et al.
3,423,594 A 1/1969 Galopin
(Continued)

FOREIGN PATENT DOCUMENTS

CN 102103237 6/2011
CN 102109644 6/2011
(Continued)

OTHER PUBLICATIONS

Notice of Reasons for Rejection dated Apr. 4, 2017 in Japanese Patent Application No. 2013-097472 (13pages).
(Continued)

*Primary Examiner* — Jerry Rahll
(74) *Attorney, Agent, or Firm* — Haynes and Boone LLP

(57) ABSTRACT

A method, system, and apparatus are disclosed for a ruggedized photonic crystal (PC) sensor packaging. In particular, the present disclosure teaches a ruggedized packaging for a photonic crystal sensor that includes of a hermetic-seal high-temperature jacket and a ferrule that eliminate the exposure of the optical fiber as well as the critical part of the photonic crystal sensor to harsh environments. The disclosed packaging methods enable photonic crystal based sensors to operate in challenging environments where adverse environmental conditions, such as electromagnetic interference (EMI), corrosive fluids, large temperature variations, and strong mechanical vibrations, currently exclude the use of traditional sensor technologies.

20 Claims, 5 Drawing Sheets

Related U.S. Application Data division of application No. 13/467,358, filed on May 9, 2012, now Pat. No. 9,500,808.

(51) Int. Cl.

| | | |
|---|---|---|
| *G02B 6/122* | (2006.01) | |
| *G01D 5/26* | (2006.01) | |
| *G02B 6/24* | (2006.01) | |
| *G02B 6/30* | (2006.01) | |
| *G01D 11/24* | (2006.01) | |
| *G01F 23/292* | (2006.01) | |

(52) U.S. Cl.
CPC .......... *G02B 6/1225* (2013.01); *G02B 6/241* (2013.01); *G02B 6/30* (2013.01); *G02B 6/366* (2013.01); *G02B 6/424* (2013.01); *G02B 6/4238* (2013.01); *G02B 6/4253* (2013.01); *G02B 6/4277* (2013.01); *G01F 23/292* (2013.01); *G02B 6/3624* (2013.01); *G02B 6/4225* (2013.01); *Y10T 29/49117* (2015.01)

(56) References Cited

U.S. PATENT DOCUMENTS

| | | | |
|---|---|---|---|
| 3,585,454 | A | 6/1971 | Roberts |
| 4,129,042 | A | 12/1978 | Rosvold |
| 4,131,905 | A | 12/1978 | Hanes et al. |
| 4,217,179 | A | 8/1980 | Fray |
| 4,291,942 | A | 9/1981 | Henry et al. |
| 4,399,541 | A | 8/1983 | Kovats et al. |
| 4,488,773 | A | 12/1984 | Wagner |
| 4,604,753 | A | 8/1986 | Sawai |
| 4,615,031 | A | 9/1986 | Eales |
| 4,682,500 | A | 7/1987 | Uda |
| 4,756,592 | A | 7/1988 | Sasayama et al. |
| 4,834,490 | A | 5/1989 | Falkenstein et al. |
| 4,979,787 | A | 12/1990 | Lichtenberger |
| 5,011,256 | A | 4/1991 | Johnson et al. |
| 5,068,865 | A | 11/1991 | Ohshima et al. |
| 5,112,456 | A | 5/1992 | Worrell et al. |
| 5,118,947 | A | 6/1992 | Hamashima et al. |
| 5,123,671 | A | 6/1992 | Driessen et al. |
| 5,336,389 | A | 8/1994 | Dubreuil |
| 5,561,294 | A | 10/1996 | Iddan |
| 5,568,585 | A | 10/1996 | Kramer |
| 5,571,394 | A | 11/1996 | Hettiarachchi et al. |
| 5,586,207 | A | 12/1996 | Goodwin |
| 5,870,511 | A | 2/1999 | Sawatari et al. |
| 6,007,218 | A | 12/1999 | German et al. |
| 6,181,760 | B1 | 1/2001 | JinKim |
| 6,330,829 | B1 | 12/2001 | Kurtz et al. |
| 6,398,931 | B1 | 6/2002 | Burchette et al. |
| 6,771,859 | B2 | 8/2004 | Carpenter |
| 6,834,154 | B2 | 12/2004 | Carpenter |
| 6,840,686 | B2 | 1/2005 | Jiang |
| 7,149,374 | B2 | 12/2006 | Lagakos et al. |
| 7,173,713 | B2 | 2/2007 | Xu et al. |
| 7,499,605 | B1 | 3/2009 | Xia et al. |
| 7,559,701 | B2 | 7/2009 | Knobloch et al. |
| 7,561,277 | B2 | 7/2009 | Chin et al. |
| 7,574,075 | B2 | 8/2009 | Xia |
| 7,684,657 | B2 | 3/2010 | Donlagic et al. |
| 7,697,798 | B2 | 4/2010 | Lagakos et al. |
| 7,930,934 | B2 | 4/2011 | Winklhofer et al. |
| 8,253,945 | B2 | 8/2012 | Gahan et al. |
| 8,369,671 | B2 | 2/2013 | Xia et al. |
| 8,559,770 | B2 | 10/2013 | Donlagic et al. |
| 2003/0227663 | A1 | 12/2003 | Agrawal et al. |
| 2004/0091217 | A1 | 5/2004 | Nawae et al. |
| 2004/0135094 | A1 | 7/2004 | Niigaki et al. |
| 2005/0047461 | A1 | 3/2005 | Kihara et al. |
| 2005/0195402 | A1* | 9/2005 | May ............... G01L 9/0079 356/480 |
| 2005/0254759 | A1 | 11/2005 | O'Brian |
| 2007/0272832 | A1 | 11/2007 | Fujimatsu et al. |
| 2008/0099414 | A1 | 5/2008 | Haslem |
| 2008/0099861 | A1 | 5/2008 | Dangtran |
| 2008/0232745 | A1 | 9/2008 | Knobloch et al. |
| 2009/0074347 | A1 | 3/2009 | Xia et al. |
| 2010/0044809 | A1 | 2/2010 | Dangtran et al. |
| 2010/0321758 | A1 | 12/2010 | Bugno et al. |
| 2011/0097031 | A1 | 4/2011 | Carralero et al. |
| 2011/0274386 | A1 | 11/2011 | Bosselmann et al. |
| 2012/0045165 | A1 | 2/2012 | Carralero et al. |

FOREIGN PATENT DOCUMENTS

| | | |
|---|---|---|
| CN | 102436045 | 5/2012 |
| DE | 102004051468 | 4/2006 |
| EP | 0662622 | 7/1995 |
| GB | 2148535 | 5/1985 |
| JP | 61-267386 | 11/1986 |
| JP | S61267386 | 11/1986 |
| JP | H3-17605 | 1/1991 |
| JP | H5-75011 | 3/1993 |
| JP | H5-167301 | 7/1993 |
| JP | 2003-197797 | 7/2003 |
| JP | 2003-329888 | 11/2003 |
| JP | 2005-94009 | 4/2005 |
| JP | 2005-136384 | 5/2005 |
| JP | 2005165200 | 6/2005 |
| JP | 2006-64680 | 3/2006 |
| JP | 2008-284379 | 11/2008 |
| JP | 2010-67892 | 3/2010 |
| JP | 2011-511267 | 4/2011 |
| WO | WO 00/29823 | 5/2000 |
| WO | WO 0029823 | 5/2000 |
| WO | WO 03/032957 | 4/2003 |
| WO | WO 20090265662 | 2/2009 |
| WO | WO 2009/085454 | 7/2009 |

OTHER PUBLICATIONS

Notification of First Office Action dated Oct. 21, 2016 in Chinese Patent Application No. 201310166846.8 (10pages).
Brian Coombe, "A Survey of MEMS-Enabled Optical Devices—Applications and Drivers for Deployment", Bechtel Telecommunications Technical Journal, vol. 4, No. 1, Bechtel Corporation, Jan. 2006.
Optical Backscatter Reflectometer, Luna Technologies, http://www.lunatechnologies.com/products/obr/obr_platform.html; printed: May 7, 2012 (2pages).
High-Resolution Reflectometer, Product No. AQ7410B, Yokogawa, http://tmi.yokogawa.com/discontinued-products/optical-measuring-instruments/optical-light-sources/aq7410b-high-resolution-reflectometer/; printed: May 8, 2012 (2pages).
Partial European Search Report for Patent Application No. 13164130.0-1562, Aug. 14, 2013 (12pages).
Angelidis, D. et. al., Optical Micromachined Pressure Sensor for Aerospace Applications, Optical Engineering, Soc. of Photo-Optical Instrumentation Engineers, Bellingham, vol. 31, No. 8, Aug. 1, 1992, pp. 1638-1641, XP000296149, ISSN: 0091-3286, DOI: 10.1117/12.58838; p. 1639, col. 2, paragraph 2—p. 1640, col. 1, paragraph 1; figures 3 and 4.
Extended European Search Report for Patent Application No. 13164130.0-1562, dated Nov. 29, 2013 (13pages).

* cited by examiner

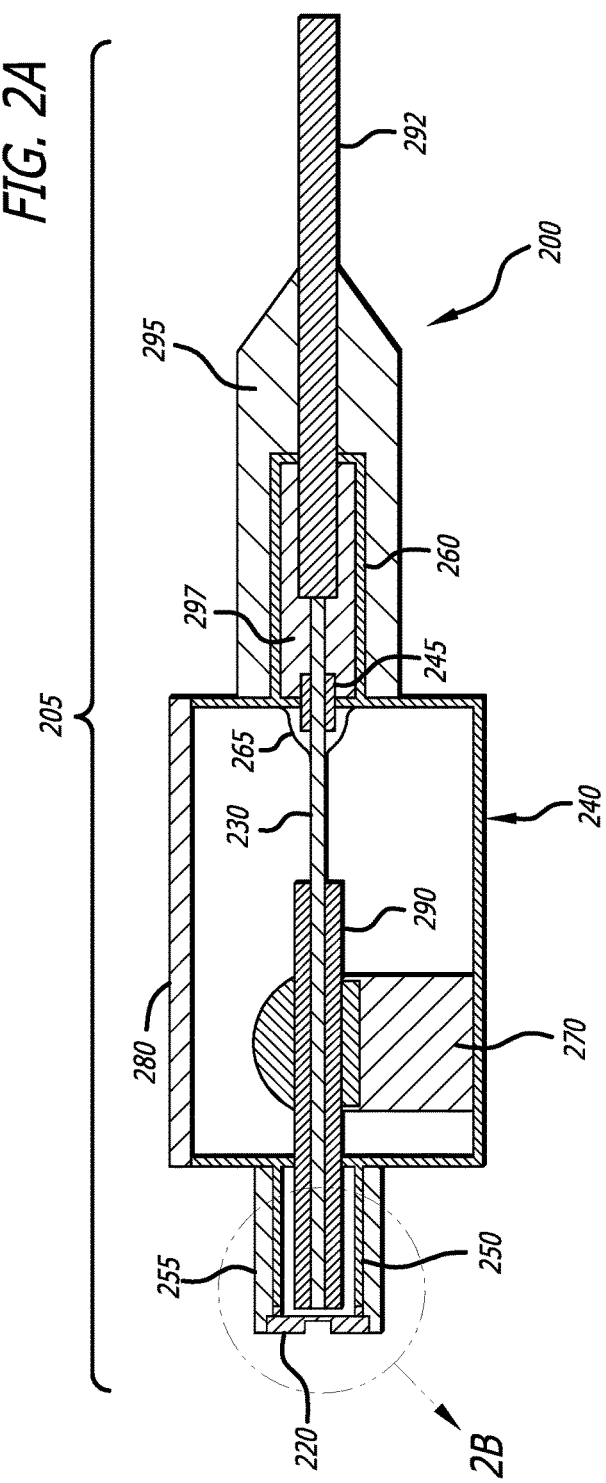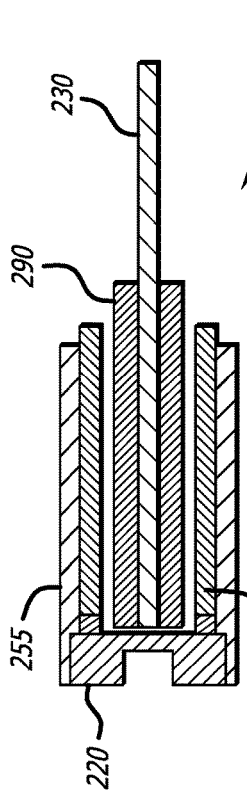

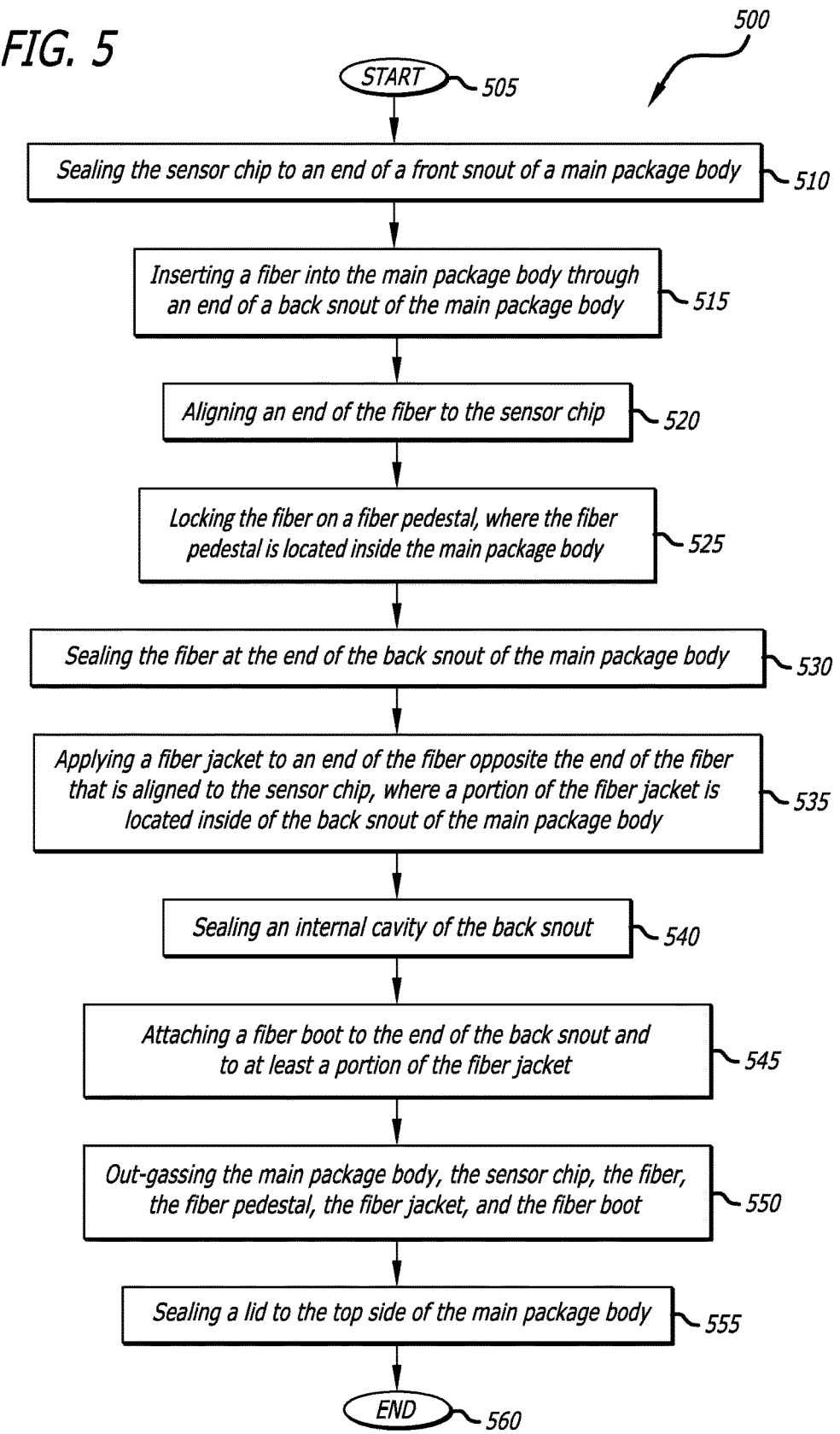

RUGGEDIZED PHOTONIC CRYSTAL SENSOR PACKAGING

CROSS-REFERENCE TO RELATED APPLICATIONS

This application is a Divisional application of, and claims the benefit of, U.S. patent application Ser. No. 15/294,584, filed Oct. 14, 2016, now U.S. Pat. No. 10,061,093, issued Aug. 28, 2018, which is a Divisional application of, and claims the benefit of, U.S. patent application Ser. No. 13/467,358, filed May 9, 2012, now U.S. Pat. No. 9,500,808, issued Nov. 22, 2016, which are both hereby incorporated by reference in their entirety.

BACKGROUND

The present disclosure relates to photonic crystals. In particular, it relates to ruggedized photonic crystal sensor packagings.

SUMMARY

The present disclosure relates to a method, system, and apparatus for a ruggedized photonic crystal sensor packaging. In one or more embodiments, a disclosed method for hermetically sealing a sensor chip involves metalizing the sensor chip with a donut pattern. In one or more embodiments, the donut pattern matches the diameter and the wall thickness of a kovar tube. The method further involves centering the sensor chip to the center axis of an end of the kovar tube. Also, the method involves soldering the sensor chip to the end of the kovar tube to form a sensor chip assembly. In addition, the method involves metalizing a fiber (i.e. an optical fiber). In addition, the method involves assembling a metal ferrule with the metalized fiber by soldering the metalized fiber inside the metal ferrule. Additionally, the method involves inserting the metal ferrule inside the kovar tube of the sensor chip assembly. In addition, the method involves aligning an end of the metalized fiber to the sensor chip of the sensor chip assembly. Further, the method involves soldering the outer surface of the metal ferrule to the inner surface of the kovar tube of the sensor chip assembly.

In one or more embodiments, a three-axis stage tool is used to center the sensor chip to the center axis of the kovar tube. In at least one embodiment, a three-axis stage tool is used to align the end of the metalized fiber to the sensor chip. In some embodiments, radio frequency (RF) induction heating is used for the soldering of the sensor chip to the end of the kovar tube. In one or more embodiments, RF induction heating and a donut shaped solder preform are used for the soldering of the outer surface of the metal ferrule to the inner surface of the kovar tube.

In at least one embodiment, a method for hermetically sealing a sensor chip involves coating the sensor chip with a glass solder donut pattern. In one or more embodiments, the glass solder donut pattern matches the diameter and the wall thickness of a ceramic tube. The method further involves centering the sensor chip to a center axis of an end of the ceramic tube. Also, the method involves soldering the sensor chip to the end of the ceramic tube to form a sensor chip assembly. Additionally, the method involves assembling a ceramic ferrule with a fiber by soldering the fiber inside the ceramic ferrule. Also, the method involves inserting the ceramic ferrule inside the ceramic tube of the sensor chip assembly. In addition, the method involves aligning an end of the fiber to the sensor chip of the sensor chip assembly. Further, the method involves soldering the outer surface of the ceramic ferrule to the inner surface of the ceramic tube of the sensor chip assembly.

In one or more embodiments, a three-axis stage tool is used to center the sensor chip to the center axis of the ceramic tube. In some embodiments, a three-axis stage tool is used to align the end of the fiber to the sensor chip. In at least one embodiment, localized thermal heating with solder glass is used for the soldering of the sensor chip to the end of the ceramic tube. In one or more embodiments, localized thermal heating and a donut-shaped glass solder preform are used for the soldering of the outer surface of the ceramic ferrule to the inner surface of the ceramic tube.

In at least one embodiment, a method for hermetically sealing a sensor chip involves sealing the sensor chip to an end of a front snout of a main package body. The method further involves inserting a fiber into an end of a back snout of the main package body. Also, the method involves aligning an end of the fiber to the sensor chip. In addition, the method involves locking the fiber on a fiber pedestal. In one or more embodiments, the fiber pedestal is located inside the main package body. In addition, the method involves sealing the fiber at the end of the back snout of the main package body. Additionally, the method involves applying a fiber jacket to an end of the fiber that is opposite the end of the fiber that is aligned to the sensor chip, where a portion of the fiber jacket is located inside of the back snout of the main package body. In addition, the method involves sealing the internal cavity of the back snout. Also, the method involves attaching a fiber boot to the end of the back snout and to at least a portion of the fiber jacket. In addition, the method involves out-gassing the main package body, the sensor chip, the fiber, the fiber pedestal, the fiber jacket, and the fiber boot. Further, the method involves sealing a lid to the top side of the main package body.

In one or more embodiments, the sealing of the sensor chip to the front snout is achieved by a self-alignment process that utilizes the surface tension of reflowed solder to center the sensor chip to a center axis of the front snout automatically when the solder is cooled and solidified. In at least one embodiment, a high precision three-dimensional micro-positioner is used for the aligning of the end of the fiber to the sensor chip. In some embodiments, the disclosed method further involves applying a protective layer of military grade epoxy to the outer surface of the front snout to protect the side wall of the sensor chip and to strengthen the sealing of the sensor chip to the front snout.

In one or more embodiments, the disclosed method further involves at least partially metalizing the fiber. For this method, in some embodiments, the sealing of the sensor chip to the end of the front snout is achieved by using high temperature solders, and by metalizing the sensor chip with a pattern that matches the size and the shape of the circumference of the end of the front snout. In at least one embodiment, the high temperature solders are a lead tin (PbSn) solder and/or a gold tin (AuSn) solder. Also for this method, in one or more embodiments, a high temperature solder is used for the locking of the fiber on the fiber pedestal. In addition, in some embodiments, for this method, solder preforms are used for the sealing of the fiber at the end of the back snout. For this method, the lid is a metal lid. Also for this method, in at least one embodiment, rolling heaters are used for the sealing of the metal lid to the top side of the main package body.

In at least one embodiment, the sealing of the sensor chip to the end of the front snout is achieved by using a circular-shape high-temperature solder-glass preform that matches the diameter of the end of the front snout or a high temperature epoxy. In at least one embodiment, the method further comprises attaching a ceramic ferrule to at least a portion of the fiber. In some embodiments, the attaching of the ceramic ferrule to at least a portion of the fiber is achieved by using a high temperature epoxy or a high temperature solder glass. In one or more embodiments, the locking of the fiber on the fiber pedestal is achieved by using a high temperature solder glass or a high temperature epoxy. In at least one embodiment, the sealing of the fiber at the end of the back snout is achieved by melting a non-conductive solder glass preform or by plotting a high temperature epoxy at the location where the fiber and the wall of the main package body interface. In some embodiments, the lid is a ceramic lid. In at least one embodiment, the sealing of the ceramic lid to the top side of the main package body is achieved by using a solder glass preform that matches the perimeter of the edges of the top side of the main package body and by using rolling heaters for the sealing.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIGS. 2A-2B are diagrams of the disclosed active alignment process to hermetically seal a photonic crystal based sensor, in accordance with at least one embodiment of the present disclosure.

FIG. 5 is a flow diagram for the disclosed active alignment process to hermetically seal a photonic crystal based sensor with either metal or non-metal components, in accordance with at least one embodiment of the present disclosure.

DESCRIPTION

The methods and apparatus disclosed herein provide an operative system for a ruggedized photonic crystal sensor packaging. In particular, the present disclosure teaches ruggedized packaging photonic crystal (PC) sensor packaging that includes a hermetic-seal high-temperature jacket and a ferrule that eliminate the exposure of the optical fiber as well as the critical part of the photonic crystal sensor to harsh environments. The packaging methods described in the present disclosure enable photonic crystal based sensors to operate in demanding aerospace environments.

Currently, fiber interferometer and fiber Bragg grating sensors are optical sensors that are attractive for many applications (such as for obtaining physical, chemical, and biological measurements) because of their structural simplicity, excellent reliability, high sensitivity, and capability of operating under critical and extreme conditions. However, the costs and sizes of these sensor systems limit their application. Such devices tend to only be suitable for laboratory use because they are heavy, bulky, and expensive.

The packaging approaches described in the present disclosure enable remote sensing in challenging environments where adverse environmental conditions, such as electromagnetic interference (EMI), corrosive fluids, large temperature variations, and strong mechanical vibrations, currently exclude the use of traditional sensor technologies. For example, employing optical fuel sensors and interconnects on modern aircraft will substantially reduce the weight and improve performance to provide a significant cost savings. Further cost savings derive from the sensors' robustness to EMI, temperature variations, corrosive media, and vibrations, which simplify the packaging and integration of these sensors into modern aircraft.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

The present disclosure teaches two approaches to implement the disclosed ruggedized hermetic photonic crystal sensor packaging. These two approaches are: (1) packaging the photonic crystal sensor with a passive fiber alignment process to hermetically seal the sensor, and (2) packaging the photonic crystal sensor with an active fiber alignment process to hermetically seal the sensor. The description of the following figures will describe these two different approaches.

Figure 1A:
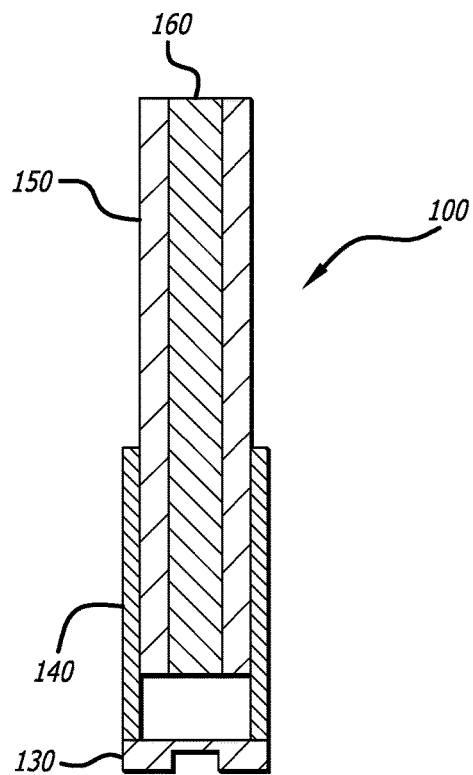
FIGS. 1A-1C are diagrams of the disclosed passive alignment process to hermetically seal a photonic crystal based sensor, in accordance with at least one embodiment of the present disclosure.
Figure 1B:
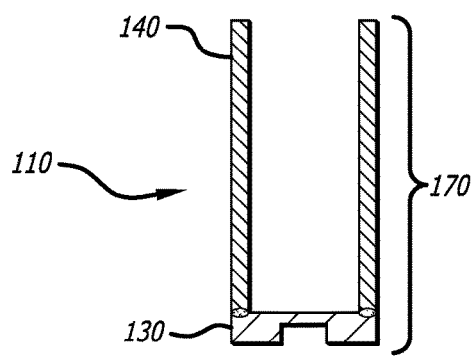
Figure 1C:
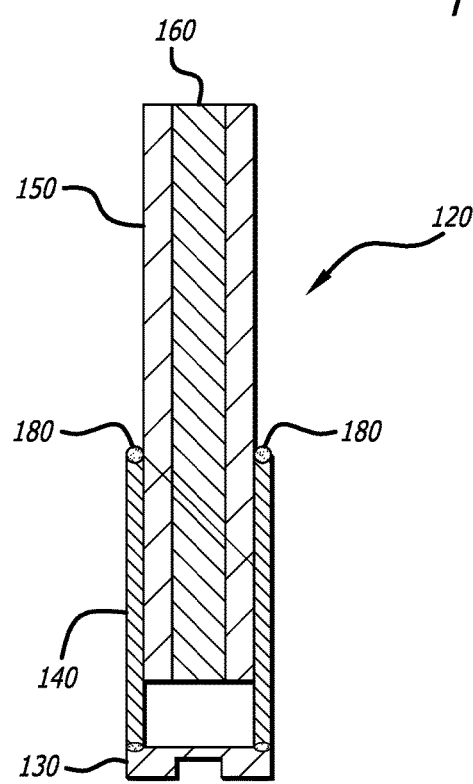

FIGS. 1A-1C are diagrams 100, 110, 120 of the disclosed passive alignment process to hermetically seal a photonic crystal based sensor 130, in accordance with at least one embodiment of the present disclosure. For the ruggedized photonic crystal sensor packaging shown in these three figures, it should be noted that the packaging may contain metal components or non-metal components. It should also be noted that for these three figures, some items identified with reference numerals may dually represent items that are manufactured from metal components and items that are manufactured from non-metal components (e.g., when the packaging contains metal components, item 140 represents a kovar tube; and when the packaging contains non-metal components, item 140 represents a ceramic tube).

When the packaging contains metal components, at the start of the process a photonic crystal based sensor chip 130 is metalized with a donut pattern (not shown) that matches the diameter and the wall thickness of a kovar tube 140 to allow soldering of the sensor chip 130 to the end of the kovar tube 140, thereby forming a sensor chip assembly 170. Radio frequency (RF) induction heating is used for this localized soldering. A three-axis stage and a microscope are used to center the sensor chip 130 to the center axis of the kovar tube 140.

Then, a metal ferrule 150 with a metalized fiber 160 is assembled by soldering the fiber 160 inside of the ferrule 150. The ferrule 150 is then inserted inside the kovar tube 140 of the sensor chip assembly 170. The kovar tube 140 with attached sensor chip 130 is aligned to the ferrule optical fiber 160 using a three-axis stage to align the end of the fiber 160 to the sensor chip 130. After the sensor chip 130 is correctly aligned to the fiber 160, a portion of outer diameter of the ferrule 150 is soldered to a portion of the inner diameter of the kovar tube 140 using RF induction heating and a donut shaped solder preform 180.

When the packaging contains non-metal components, at the start of the process a photonic crystal based sensor chip 130 is coated with a glass solder donut pattern (not shown) that matches the diameter and the wall thickness of the ceramic tube 140 to allow soldering of the sensor chip 130 to the end of the ceramic tube 140, thereby forming a sensor chip assembly 170. Localized thermal heating can be used with solder glass for this soldering process. A three-axis stage and microscope are used to center the sensor chip 130 to the center axis of the ceramic tube 140.

After the sensor chip 130 is soldered to the end of the ceramic tube 140, a ceramic ferrule 150 with an optical fiber 160 is assembled using solder glass to attach the fiber 160 inside of the ferrule 150. Then, the ferrule 150 is inserted inside the ceramic tube 140 of the sensor chip assembly 170. The ceramic tube 140 with the attached sensor chip 130 is aligned to the ferrule optical fiber 160 using a three-axis stage to align the end of the fiber 160 to the sensor chip 130. When the sensor chip 130 is correctly aligned to the fiber 160, a portion of the outer diameter of ferrule 150 is soldered to the inner diameter of the ceramic tube 140 by using localized thermal heating and a donut-shaped glass solder preform 180.

FIGS. 2A-2B are diagrams 200, 210 of the disclosed active alignment process to hermetically seal a photonic crystal based sensor 220, in accordance with at least one embodiment of the present disclosure. Similar to FIGS. 1A-1C, the packaging of these figures may contain metal components or non-metal components. Also similar to FIGS. 1A-1C, some items identified with reference numerals in these figures may dually represent items that are manufactured from metal components and items that are manufactured from non-metal components.

In particular, FIGS. 2A-2B depict the disclosed hermetically sealed photonic crystal sensor 220 using an active fiber alignment technique to attach to a multimode fiber 230 for aerospace applications. This approach provides a process for photonic crystal sensor packaging where high precision active alignment of the optical fiber 230 to the photonic crystal sensor 220 is critical. As shown in these figures, this approach starts with a main package body 240 that has two integrated snouts 250, 260, which are also referred to as nose tubes 250, 260. The snout 250 located at the front side of the package body 240 (i.e. front snout 250) is for the attachment of the silicon-on-insulator (SOI) photonic crystal sensor 220 to the package body 240; and snout 260 located at the back side (i.e. back snout 260) of the package body 140 is for the attachment of the optical fiber 230 to the package body 240.

Inside the package body 240 is a fiber pedestal 270 that is used to attach the optical fiber 230 to the inside the package body 240 after active alignment of the fiber 230 to the photonic crystal sensor 220 is performed. This particular attachment process is referred to as the "fiber locking" process, which is a crucial step to lock the fiber 230 at its optimum optically aligned position to the photonic crystal sensor 220. At the top of the package body 240 is a lid 280, which is used as the final seal of the package body 240 after the fiber 230 alignment, attachment to the package pedestal 270, and fiber seal to the package wall at the back snout are complete. For sensor applications where metal packaging is allowed, the main package body 240 and the lid 280 are made of kovar plated with gold. For sensor applications where the use of metal is not allowed (e.g., for fuel and/or explosive gas sensors), the package body 240 and the lid 280 are manufactured from ceramics, such as alumina or aluminum nitride (AlN). The details of the packaging processes of FIGS. 2A-2B are described below.

At the beginning of the process, the SOI sensor 220 is attached to the front snout 250 of the package body 240. For a metal packaging, the SOI sensor 220 is attached to the front snout 250 by using high temperature solders, such as a lead tin (PbSn) solder or a gold tin (AuSn) solder. For a ceramic packaging, the SOI sensor 220 is attached to the front snout 250 by using a high temperature solder glass or epoxy. This attachment process will coarsely align the sensor 220 to the center of the front snout 250 to facilitate subsequent steps for fine active fiber alignment. A pre-metalized pattern is formed on the sensor 220 to match the size and shape of the front snout's 250 circumference. High temperature soldering of the snout 250 circumference to the sensor 220 is achieved by a self-alignment soldering process. The self alignment process utilizes the surface tension of the reflow solder to automatically align the center of the sensor 220 to the center axis of the front snout upon solidification of the solder. For a non-metal packaging, a circular-shaped high-temperature solder-glass preform, which matches the diameter of the front snout 250, is used to seal the sensor 220 to the front snout 250. An additional layer of military grade epoxy 255 is added to the outer surface of the front snout to protect the side wall of the sensor 220; it also strengthens the attachment of the sensor 220 to the front snout.

Next, the optical fiber 230 is inserted into the package body 240 through the back snout 260 of the package body 240. For a metal packaging, the fiber 230 is partially metalized for solder joining of the fiber 230 to the pedestal 270 inside of the package body 240. For a ceramic packaging, metallization of the fiber is not needed. Also for a ceramic packaging, the optical fiber 230 has the option to attach to a ceramic ferrule 290 to strengthen the fiber 230 tip section for a highly vibratory environment. Attachment of the ferrule 290 to the fiber 230 is achieved by a high temperature epoxy or solder glass without using a metal solder. Active alignment of the fiber 230 to the sensor 220 is accomplished by holding the fiber 230 with a pair of fiber tweezers (not shown) that are attached to a high precision three-dimensional micro-positioner (not shown). The fiber 230 is moved to its optimum position by inputting a light signal to the fiber 230 which illuminates the sensor 220 surface, and the reflection spectrum from the sensor 220 is monitored during the fiber alignment process. After the fiber 230 is actively aligned to the sensor 220 at its optimum position, the fiber 220 (with or without the ferrule 290) is "locked" on fiber pedestal 270 by either a high temperature solder, solder glass, or epoxy, depending upon the sensor's 220 target application. For a fuel sensor application, a high temperature solder glass or epoxy is used instead of a metallic high temperature solder.

After fiber 230 is locked, the fiber 230 is sealed at the back snout 260 of the package body 240. For a metal packaging, a short section of the fiber 230 at the package 240 wall location by the back snout is pre-coated with a gold/nickel (Au/Ni) layer 245 for hermetic sealing of the fiber 230 to the package 240 wall. This metalized fiber 230 to metal package 240 wall sealing process is accomplished with solder pre-forms heated by a localized RF induction furnace or a high temperature hot-tweezers heater applied to the back snout. For a non-metal (ceramic) packaging, the fiber 230 to package 240 seal is performed by melting non-conductive solder glass preforms or by a plotting a high temperature epoxy at the fiber and package wall interface 265.

After the fiber 230 is sealed to the package 240 wall, additional epoxy is applied to fill the inner cavity 297 of the back snout 260, and the epoxy is cured with the fiber 230 pigtail's outer jacket (i.e. fiber jacket) 292 partially embedded inside the snout 260 for strain relief. A fiber boot 295 is attached to the back snout 260 over the fiber 230 pigtail by a fully cured space-grade epoxy; additional steps are taken to ensure that no air bubbles are embedded inside the cured epoxy. The function of the fiber boot 295 is to limit the bending of the fiber 230 pigtail so as to not exceed its allowable bend radius; this will prevent fiber 230 breakage at the back snout 260 of the package body 240.

After the fiber 230 pigtail is attached, the entire package 205 (i.e. the package body 240 including the sensor 220, the fiber 230, the fiber pedestal 270, the optional ferrule 290, the fiber jacket 292, and the fiber boot 295) is placed inside a nitrogen purged seam sealer (also called a dry box). The entire package 205 is first heated for a several hours for out-gassing. After the entire package 205 is fully out-gassed, the sealing of a lid 280 on the top of the package body 240 will be performed. For a metal packaging, a metal (e.g., kovar) lid 280 is high temperature sealed to the top edges of the package body 240 by a pair of automatic rolling heaters. The package body 240 is first placed on a stage that can rotate ninety (90) degrees during the lid sealing process. Next, the metal lid 280 is placed on top of the package body 240. A pair of rolling heaters (not shown) first makes contact to the first two parallel edges of the package lid 280. The rollers are then heated, and rolled along the first two parallel lid edges to seal the lid 280 to the package body 240. Then, the package body 240 is rotated 90 degrees, and the rollers repeat the heating process to seal the other two parallel edges of lid 280 to the package body 240. This lid-to-package sealing process with a pair of rolling heaters is also called a "parallel seam welding process". For the case of a non-metal packaging, the lid 280 will be made from a ceramic material, and a solder glass preform matching the perimeter of the package body's 240 top edge is put on the package body's 240 top edge. Then the ceramic lid 280 is placed on top of the solder glass preform. The pair of rolling heaters performs a similar parallel seam welding process like the process described for the metal packaging, except the temperature of the heater rollers is set at the solder glass's melting temperature.

After parallel seam sealing process is completed, the whole package 205 is tested for hermeticity with a Helium leak tester. A leak rate less than approximately 1E-6 cc/min is commonly considered to be an acceptable hermetic photonic crystal sensor package.

Figure 3:
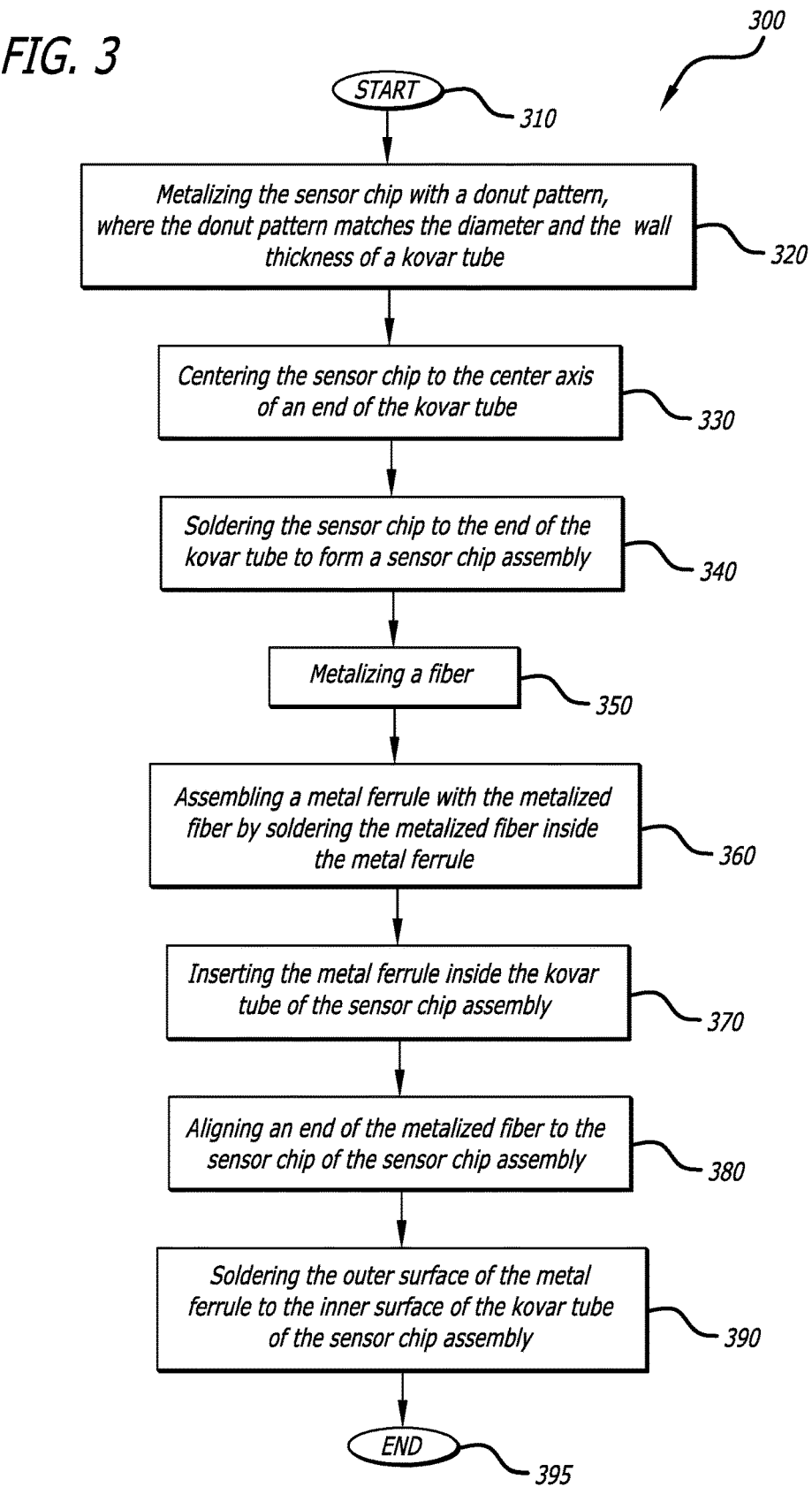
FIG. 3 is a flow diagram for the disclosed passive alignment process to hermetically seal a photonic crystal based sensor with metal components, in accordance with at least one embodiment of the present disclosure.

FIG. 3 is a flow diagram 300 for the disclosed passive alignment process to hermetically seal a photonic crystal based sensor with metal components, in accordance with at least one embodiment of the present disclosure. At the start 310 of the process, a sensor chip is metalized with a donut pattern 320. The donut pattern matches the diameter and the wall thickness of a kovar tube. Then, the sensor chip is centered to the center axis of an end of the kovar tube 330. After the sensor chip is centered, the sensor chip is soldered to the end of the kovar tube to form a sensor chip assembly 340.

A fiber is metalized 350. Then, a metal ferrule is assembled with the metalized fiber by soldering the metalized fiber inside of the metal ferrule 360. After the metalized fiber is soldered, the metal ferrule is inserted inside the kovar tube of the sensor chip assembly 370. Then, an end of the metalized fiber is aligned to the sensor chip of the sensor chip assembly 380. After the metalized fiber is aligned, at least a portion of the outer surface of the metal ferrule is soldered to at least a portion of the inner surface of the kovar tube of the sensor chip assembly 390. After the outer surface of the metal ferrule is soldered to at least a portion of the inner surface of the kovar tube, the process ends 395.

Figure 4:
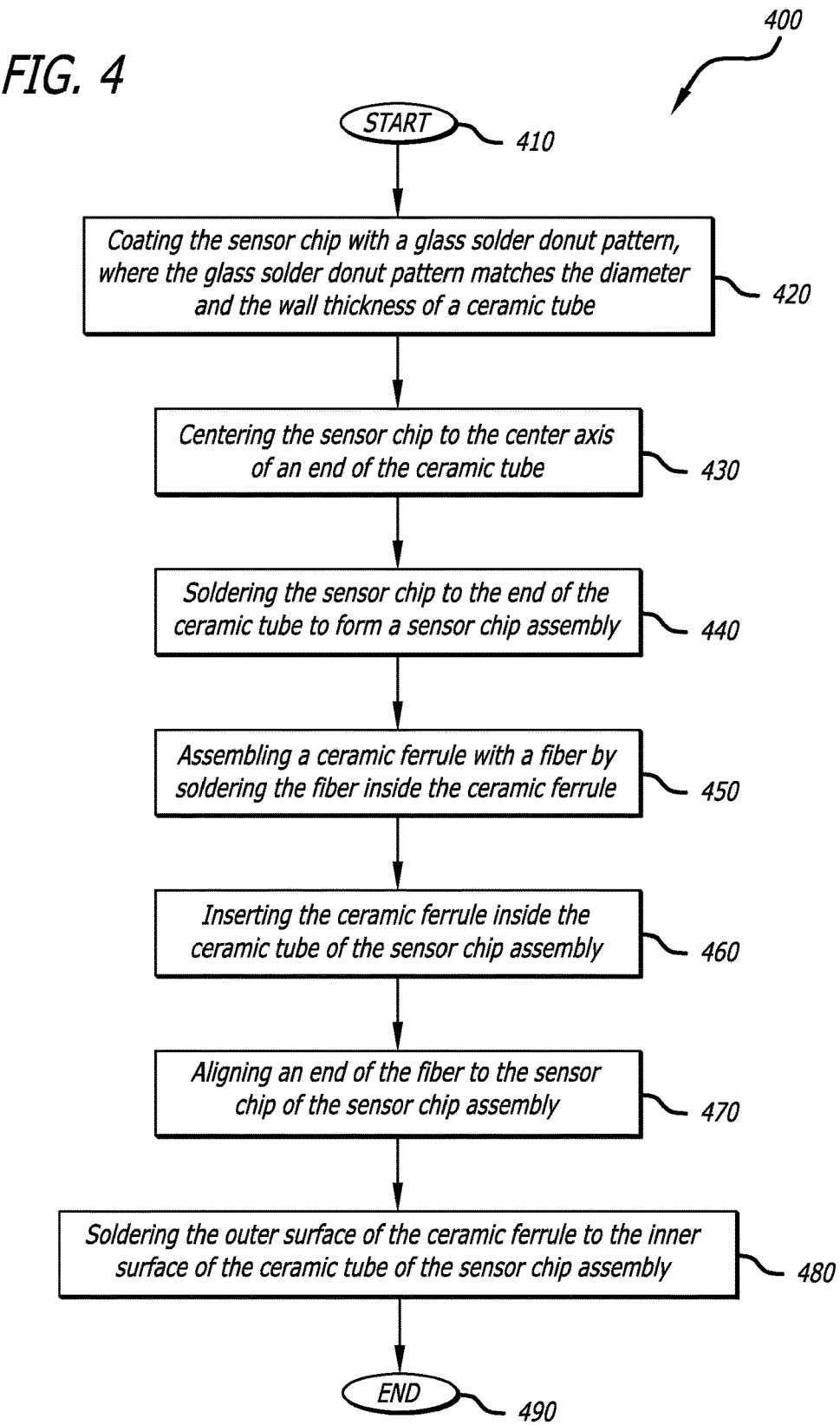
FIG. 4 is a flow diagram for the disclosed passive alignment process to hermetically seal a photonic crystal based sensor with non-metal components, in accordance with at least one embodiment of the present disclosure.

FIG. 4 is a flow diagram 400 for the disclosed passive alignment process to hermetically seal a photonic crystal based sensor with non-metal components, in accordance with at least one embodiment of the present disclosure. At the start 410 of the process, a sensor chip is coated with a glass solder donut pattern 420. The glass solder donut pattern matches the diameter and the wall thickness of ceramic tube. The sensor chip is then centered to the center axis of an end of the ceramic tube 430. After the sensor chip is centered, the sensor chip is soldered to the end of the ceramic tube to form a sensor chip assembly 440.

Then, a ceramic ferrule is assembled with a fiber by soldering the fiber inside of the ceramic ferrule 450. After the fiber is soldered, the ceramic ferrule is inserted inside the ceramic tube of the sensor chip assembly 460. An end of the fiber is then aligned to the sensor chip of the sensor chip assembly 470. After the fiber is aligned, at least a portion of the outer surface of the ceramic ferrule is soldered to at least a portion of the inner surface of the ceramic tube of the sensor chip assembly 480. After the outer surface of the ceramic ferrule is soldered to at least a portion of the inner surface of the ceramic tube, the process ends 490.

FIG. 5 is a flow diagram 500 for the disclosed active alignment process to hermetically seal a photonic crystal based sensor with either metal or non-metal components, in accordance with at least one embodiment of the present disclosure. At the start 505 of the process, a sensor chip is sealed to an end of a front snout of a main package body 510. Then, a fiber is inserted into the main package body through an end of a back snout 515. The end of the fiber is then aligned to the sensor chip 520. After the end of the fiber is aligned, the fiber is locked to a fiber pedestal, where the fiber pedestal is located inside the main package body 525. Then, the fiber is sealed at the end of the back snout of the main package body 530.

A fiber jacket is then applied to an end of the fiber that is opposite the end of the fiber that is aligned to the sensor chip, where a portion of the fiber jacket is located inside of the back snout of the main package body 535. Then, the internal cavity of the back snout is sealed 540. A fiber boot is then attached to the end of the back snout and to at least a portion of the fiber jacket 545. Then, out-gassing of the main package body, the sensor chip, the fiber, the fiber pedestal, the fiber jacket, and the fiber boot is performed 550. After the out-gassing is performed, a lid is sealed to the top side of the main package body 555. After the lid is sealed to the main package body, the process ends 560.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for hermetically sealing a sensor chip, the method comprising:
   coating the sensor chip, wherein the sensor chip is a photonic crystal (PC) sensor chip;

centering the sensor chip to a center axis of an end of a ceramic tube;

soldering the sensor chip to the end of the ceramic tube to form a sensor chip assembly;

assembling a ceramic ferrule with a fiber;

inserting the ceramic ferrule inside the ceramic tube of the sensor chip assembly;

aligning an end of the fiber to the sensor chip of the sensor chip assembly; and soldering at least a portion of an outer surface of the ceramic ferrule to at least a portion of an inner surface of the ceramic tube of the sensor chip assembly.

2. The method of claim 1, wherein the coating of the sensor chip is performed with a glass solder donut pattern.

3. The method of claim 2, wherein the glass solder donut pattern matches a diameter and a wall thickness of the ceramic tube.

4. The method of claim 1, wherein the assembling of the ceramic ferrule with the fiber is performed by soldering the fiber inside the ceramic ferrule.

5. The method of claim 1, wherein the centering of the sensor chip to the center axis of the ceramic tube is performed by a three-axis stage tool.

6. The method of claim 1, wherein the centering of the sensor chip to the center axis of the ceramic tube is performed by a three-axis stage and microscope.

7. The method of claim 1, wherein the aligning of the end of the fiber to the sensor chip is performed by a three-axis stage tool.

8. The method of claim 1, wherein the soldering of the sensor chip to the end of the ceramic tube is performed by localized thermal heating.

9. The method of claim 1, wherein the soldering of the sensor chip to the end of the ceramic tube is performed by localized thermal heating with solder glass.

10. The method of claim 1, wherein the soldering of the outer surface of the ceramic ferrule to the inner surface of the ceramic tube is performed by localized thermal heating.

11. The method of claim 1, wherein the soldering of the outer surface of the ceramic ferrule to the inner surface of the ceramic tube is performed by localized thermal heating and a donut-shaped glass solder preform.

12. The method of claim 1, wherein the fiber is a multi-mode fiber.

13. An apparatus for a hermetically sealed sensor chip, the apparatus comprising:
a sensor chip assembly comprising the sensor chip soldered to an end of a ceramic tube, wherein the sensor chip is a photonic crystal (PC) sensor chip;
a fiber; and
a ceramic ferrule, wherein the fiber is disposed inside the ceramic ferrule, the ceramic ferrule is disposed inside the ceramic tube of the sensor chip assembly, an end of the fiber is aligned with the sensor chip of the sensor chip assembly, and at least a portion of an outer surface of the ceramic ferrule is soldered to at least a portion of an inner surface of the ceramic tube of the sensor chip assembly.

14. The apparatus of claim 13, wherein the sensor chip is soldered to the end of the ceramic tube by localized thermal heating with solder glass.

15. The apparatus of claim 13, wherein the sensor chip is coated with a glass solder donut pattern.

16. The apparatus of claim 15, wherein the glass solder donut pattern matches a diameter and a wall thickness of the ceramic tube.

17. The apparatus of claim 13, wherein the sensor chip is located at a center axis of an end of the ceramic tube.

18. The apparatus of claim 13, wherein the fiber is soldered inside the ceramic ferrule.

19. The apparatus of claim 13, wherein the outer surface of the ceramic ferrule is soldered to the inner surface of the ceramic tube by localized thermal heating and a donut-shaped glass solder preform.

20. The apparatus of claim 13, wherein the fiber is a multi-mode fiber.

* * * * *